United States Patent [19]

Zink

[11] Patent Number: 5,071,480

[45] Date of Patent: Dec. 10, 1991

[54] FLUORAN COLOR FORMER MIXTURE AND USE THEREOF IN RECORDING MATERIALS

[75] Inventor: Rudolf Zink, Therwil, Switzerland

[73] Assignee: Ciba-Geigy Corporation, Ardsley, N.Y.

[21] Appl. No.: 489,728

[22] Filed: Feb. 28, 1990

Related U.S. Application Data

[63] Continuation of Ser. No. 113,839, Oct. 26, 1987, abandoned.

[30] Foreign Application Priority Data

Oct. 31, 1986 [CH] Switzerland ........................ 4313/86
Jan. 16, 1987 [CH] Switzerland ........................ 158/87

[51] Int. Cl.[5] ........................ B41M 5/145; B41M 5/28; C09D 11/00

[52] U.S. Cl. ........................ 106/21; 427/151; 503/204; 503/221; 549/226

[58] Field of Search ........................ 106/21; 427/151; 503/204, 221; 549/226

[56] References Cited

U.S. PATENT DOCUMENTS

| | | | |
|---|---|---|---|
| 3,514,310 | 5/1970 | Kimura et al. | 117/36.2 |
| 3,825,432 | 1/1974 | Futaki et al. | 503/226 |
| 3,839,361 | 9/1974 | Terayama et al. | 503/221 |
| 3,844,817 | 10/1974 | Terayama et al. | 117/36.2 |
| 3,857,675 | 12/1974 | Schwab et al. | 8/25 |
| 3,959,571 | 5/1976 | Yahagi et al. | 428/537 |
| 3,998,846 | 10/1976 | Terayama et al. | 549/226 |
| 4,376,150 | 7/1983 | Morita et al. | 427/150 |
| 4,544,936 | 10/1985 | Yokoi | 346/209 |

FOREIGN PATENT DOCUMENTS

| | | | |
|---|---|---|---|
| 0098728 | 5/1984 | European Pat. Off. | 503/221 |
| 3300229 | 7/1983 | Fed. Rep. of Germany | 503/221 |
| 1546851 | 10/1968 | France | 503/221 |
| 2230632 | 12/1974 | France | 503/221 |
| 1297598 | 4/1972 | United Kingdom | 503/221 |
| 2115943 | 9/1983 | United Kingdom | 503/221 |

OTHER PUBLICATIONS

Patent Abstract of Japan 7,24 (M-189) 1169 (1983).

*Primary Examiner*—Bruce H. Hess
*Attorney, Agent, or Firm*—Wenderoth, Lind & Ponack

[57] ABSTRACT

Fluoran color former mixtures which contain at least (a) a fluoran compound of the formula

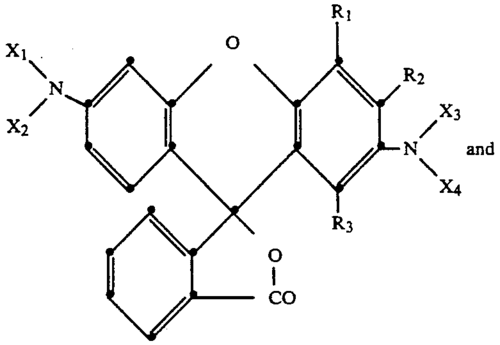

(1)

and (b) a fluoran compound of the formula

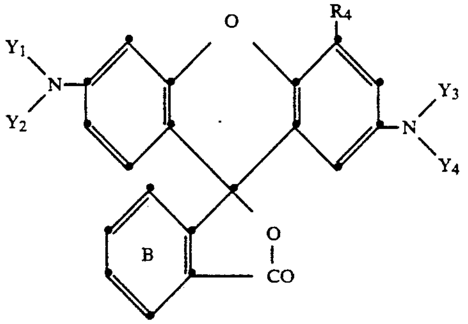

(2)

in which $R_1$, $R_3$ and $R_4$ are hydrogen, halogen, lower alkyl or lower alkoxy, $R_2$ is halogen, lower alkyl or lower alkoxy, $X_1$, $X_2$, $Y_1$ and $Y_2$ are hydrogen, unsubstituted or halogen, hydroxyl, cyano or (lower alkoxy)-substituted alkyl, cycloalkyl, aryl or aralkyl, $X_3$ and $Y_3$ are hydrogen, unsubstituted or halogen-hydroxyl-, cyano- or (lower alkoxy)-substituted alkyl, cycloalkyl, aryl or aralkyl, $X_4$ and $Y_4$ are unsubstituted or halogen-, hydroxyl-, cyano- or (lower alkoxy)-substituted alkyl, cycloalkyl or aralkyl or ($X_1$ and $X_2$), ($X_3$ and $X_4$), ($Y_1$ and $Y_2$) and $Y_3$ and $Y_4$) are each, together with the shared nitrogen atom, a five- or six-membered heterocyclic radical and the rings A and B are substituted or unsubstituted, develop in recording systems deep and stable colorings and are suitable in particular for black recordings.

4 Claims, No Drawings

FLUORAN COLOR FORMER MIXTURE AND USE THEREOF IN RECORDING MATERIALS

This application is a continuation of now abandoned application, Ser. No. 07/113,839 filed on Oct. 26, 1987 now aband.

The present invention relates to a fluoran colour former mixture and to the use thereof in a pressure-sensitive or particularly in a heat-sensitive recording material In heat-sensitive systems, the fluoran colour former mixture has a uniform build-up of shade at all response temperatures. The fluoran colour former mixture contains at least (a) a fluoran compound of the formula

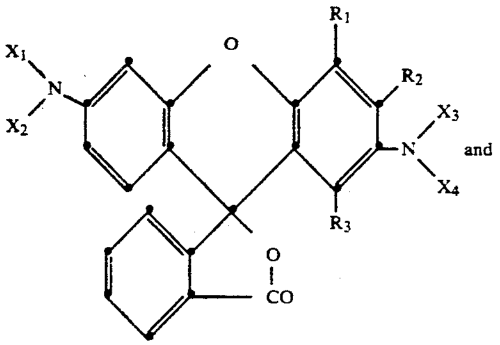

(1)

and (b) a fluoran compound of the formula

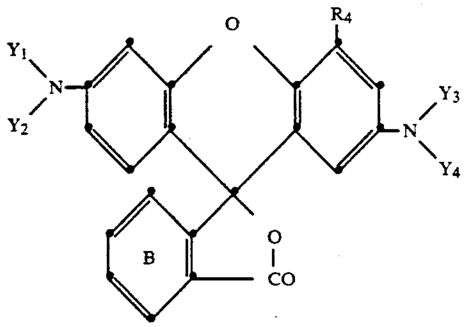

(2)

in which $R_1$, $R_3$ and $R_4$, are each, independently of the others, hydrogen, halogen, lower alkyl or lower alkoxy, $R_2$ is halogen, lower alkyl or lower alkoxy, $X_1$, $X_2$, $Y_1$ and $Y_2$ are each, independently of the others, hydrogen, unsubstituted or halogen-, hydroxyl-, cyano- or (lower alkoxy)-substituted alkyl having at most 12 carbon atoms, cycloalkyl, aryl or aralkyl, $X_3$ and $Y_3$ are each, independently of the other, hydrogen, unsubstituted or halogen-, hydroxyl-, cyano- or (lower alkoxy)-substituted alkyl having at most 12 carbon atoms, cycloalkyl, aryl or aralkyl, $X_4$ and $Y_4$ are each, independently of the other, unsubstituted or halogen-, hydroxyl-, cyano- or (lower alkoxy)-substituted alkyl having at most 12 carbon atoms, cycloalkyl or aralkyl or ($X_1$ and $X_2$), ($X_3$ and $X_4$), ($Y_1$ and $Y_2$) and ($Y_3$ and $Y_4$) are each, independently of the others, together with the shared nitrogen atom, a five- or six-membered, preferably saturated, heterocyclic radical, and the rings A and B are each, independently of the other, unsubstituted or substituted by halogen, nitro, amino, mono(lower alkyl)amino or di(lower alkyl)amino.

The components of the formulae (1) and (2) can be present as individual compounds or as mixtures. Lower alkyl and lower alkoxy are in general in the definition of the radicals on the fluorans those groups or group constituents which have 1 to 5, in particular 1 to 3, carbon atoms, for example methyl, ethyl, n-propyl, isopropyl, n-butyl, sec.-butyl, tert.-butyl or amyl on the one hand or methoxy, ethoxy, isopropoxy, tert.-butoxy or tert.-amyloxy on Alkyl groups X and Y can be straight-chain or branched alkyl radicals. Examples of such alkyl radicals are methyl, ethyl, n-propyl, isopropyl, n-butyl, sec.-butyl, amyl, n-hexyl, 2-ethylhexyl, n-heptyl, n-octyl, isooctyl, n-nonyl, isononyl and n-dodecyl.

Substituted alkyl radicals X and Y are in particular cyanoalkyl, haloalkyl, hydroxyalkyl or alkoxyalkyl, in each case preferably of in total 2 to 6 carbon atoms, for example β-cyanoethyl, β-chloroethyl, γ-chloropropyl, β-hydroxyethyl, γ-hydroxypropyl, β-methoxyethyl or β-ethoxyethyl.

Examples of cycloalkyls X and Y are cyclopentyl and preferably cyclohexyl.

Aralkyls $X_1$–$X_4$ and $Y_1$–$Y_4$ are generally phenylethyl, phenylisopropyl or first and foremost benzyl, while aryls $X_1$, $X_2$, $X_3$, $Y_1$, $Y_2$ and $Y_3$ are advantageously naphthyl, diphenyl or in particular phenyl. The aralkyl and aryl radicals can be substituted by halogen, trifluoromethyl, cyano, nitro, lower alkyl, lower alkoxy, (lower alkoxy)carbonyl or (lower alkyl)carbonyl.

Preferred substituents in the benzyl and phenyl group of the X and Y radicals are for example halogen, trifluoromethyl, cyano, methyl, methoxy or carbomethoxy. Examples of such araliphatic and aromatic radicals are methylbenzyl, 2,4- or 2,5-dimethylbenzyl, chlorobenzyl, dichlorobenzyl, cyanophenyl, tolyl, xylyl, chlorophenyl, trifluoromethylphenyl, methoxyphenyl and carbomethoxyphenyl.

A heterocyclic radical composed of substituent pairs ($X_1$ and $X_2$), ($X_3$ and $X_4$), ($Y_1$ and $Y_2$) and ($Y_3$ and $Y_4$) together with the shared nitrogen atom is for example pyrrolidino, piperidino, pipecolino, morpholino, thiomorpholino or piperazino, e.g. methylpiperazino. Preferred saturated heterocyclic radicals $-NX_1X_2$, $-NX_3X_4$, $-NY_1Y_2$ and $-NY_3Y_4$ are pyrrolidino, piperidino and morpholino.

The X and Y substituents can be identical to or different from each other. $X_1$ and $Y_1$ are preferably $C_1$–$C_8$-alkyl, cyclohexyl, phenyl, tolyl, benzyl or in particular lower alkyl. $X_2$ and $Y_2$ are preferably lower alkyl or benzyl or in particular methyl or ethyl.

Not only $-NX_1X_2$ but also $-NY_1Y_2$ can preferably also be pyrrolidino.

The further N substituents $X_3$, $X_4$, $Y_3$ and $Y_4$ are preferably $C_1$–$C_8$-alkyl, phenylethyl, phenylisopropyl, cyclohexyl or in particular benzyl, which is unsubstituted or substituted by 1 to 5 methyls or halogens. Aryl radicals $X_3$ and $Y_3$ are in particular phenyl, 2-chlorophenyl or tolyl. Particularly preferred amino groups $-NX_3X_4$ and $-NY_3Y_4$ are diethylamino, n-octylamino, benzylamino, phenylethylamino, di(-phenylethyl)amino, phenylisopropylamino, N-phenyl- N-methylamino and in particular di-(2- or 4-methylbenzyl)amino or dibenzylamino.

$R_1$, $R_3$ and $R_4$ are preferably hydrogen, halogen or methyl. $R_2$ is in particular ethyl and especially methyl.

The rings A and B are preferably not further substituted. Otherwise they are first and foremost substituted by halogen, nitro or di(lower alkyl)amino.

Halogen is for example, fluorine, bromine, iodine or preferably chlorine.

Practically important components (a) conform to the formula

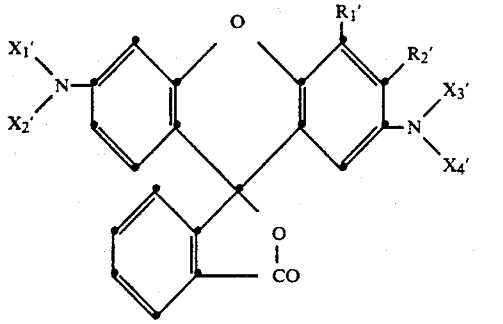

(3)

in which $R_1'$ is hydrogen or methyl, $R_2'$ is halogen, methyl or ethyl, $X_1'$ is $C_1$–$C_6$-alkyl, $C_5$–$C_6$-cycloalkyl, $C_7$–$C_9$-phenylalkyl, phenyl or halogen-, $C_1$–$C_4$-alkyl- or $C_1$–$C_4$-alkoxy-substituted phenyl, $X_2'$ is $C_1$–$C_6$-alkyl or $C_7$–$C_9$-phenylalkyl or —$NX_1'X_2'$ is pyrrolidinyl, piperidinyl or morpholinyl, $X_3'$ and $X_4'$ are each $C_7$–$C_9$-phenylalkyl, chlorobenzyl or $C_1$–$C_4$-alkylbenzyl.

Preferred colour formers of components (b) conform to the formula

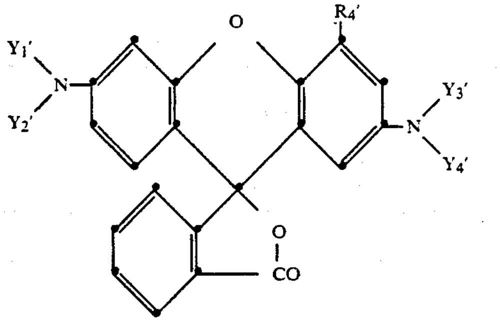

(4)

in which $R_4'$ is hydrogen, halogen or methyl, $Y_1'$ is $C_1$–$C_6$-alkyl, $C_5$–$C_6$-cycloalkyl, $C_7$–$C_9$-phenylalkyl, phenyl or halogen-, $C_1$–$C_4$-alkyl- or $C_1$–$C_4$-alkoxy-substituted phenyl, $Y_2'$ is $C_1$–$C_6$-alkyl or $C_7$–$C_9$-phenylalkyl or —$NY_1'Y_2'$ is pyrrolidinyl, piperidinyl or morpholinyl, $Y_3'$ is hydrogen, $C_1$–$C_8$-alkyl, phenyl, $C_7$–$C_9$-phenylalkyl, chlorobenzyl or $C_1$–$C_4$-alkylbenzyl and $Y_4'$ is $C_1$–$C_8$-alkyl, $C_7$–$C_9$-phenylalkyl, chlorobenzyl or $C_1$–$C_4$-alkylbenzyl.

Particularly preferred fluoran colour former mixtures contain fluoran compounds of the formulae (3) and (4) in which $X_1'$ and $Y_1'$ are each $C_1$–$C_4$-alkyl, cyclohexyl, phenyl or tolyl, $X_2'$ and $Y_2'$ are each $C_1$–$C_4$-alkyl or —$NX_1'X_2'$ or —$NY_1'Y_2'$ are pyrrolidino and $X_3'$, $X_4'$, $Y_3'$ and $Y_4'$ are each $C_7$–$C_9$-phenylalkyl or chlorine- or methyl-ringsubstituted benzyl.

The novel fluoran colour former mixtures can be prepared by simply mixing and if necessary by milling said components (a) and (b) to produce homogeneous powder mixtures which are stable to storage at room temperature. Components (a) and (b) can be used not only in crystalline form but also in the amorphous state. The amorphous form can be produced before or after mixing.

The colour former components (a) and (b) are generally present in a weight ratio of 1:5 to 1:1, preferably 1:3 to 1:2 and in particular 1:2 to 1:1. In this way the desired shades can be produced.

The colour former mixtures according to the invention are very highly suitable for producing pressure-sensitive and in particular heat-sensitive recording systems. For this purpose, components (a) and (b) can also be used separately.

The colour former mixtures are normally colourless or at most slightly coloured. If these colour formers are contacted with a preferably acid developer, i.e. an electron acceptor, they produce deep grey to black colours which are highly light-fast. They can also be used in a mixture with one or more other known colour formers, for example 3,3-(bis-aminophenyl)-phthalides, 3-indolyl-3-aminophenylazaphthalides, 3,3-(bis-indolyl)-phthalides, 3-aminofluorans, 2-amino-6-arylaminofluorans, leucoauramines, spiropyrans, dispiropyrans, phenoxazines, phenothiazines, carbazolylmethanes and further triarylmethan leuco dyes.

The colour former mixtures of components (a) and (b) exhibit excellent colour intensity and light fastness not only on phenolic substrates but also on clays and substituted zinc salicylates. They are suitable in particular for use as very rapidly developing colour formers for use in a pressure-sensitive or in particular heat-sensitive recording material which can be not only a copying but also a registering material. They are highly soluble in capsule oils and are substantially stable to CB decline (decrease in colour strength through exposure in a CB sheet). Black recordings produced with the colour former mixture according to the invention on clays have improved stability to storage without change in shade compared with recordings obtained with a single component, for example 2-phenylamino-3-methyl-6-diethylaminofluoran.

A pressure-sensitive material consists for example of at least one pair of sheets which contain at least one colour former mixture of components (a) and (b) dissolved in an organic solvent and an electron acceptor as developer.

Typical examples of such developers are active clay substances, such as attapulgite clay, acid clay, bentonite, montmorillonite, activated clay, for example acid-activated bentonite or montmorillonite, and also zeolite, halloysite, silica, alumina, aluminium sulfate, aluminium phosphate, zinc chloride, zinc nitrate, kaolin or any other desired clay or acidic organic compound, for example unsubstituted or ring-substituted phenols, salicylic acid or salicylic acid esters and metal salts thereof, and also acidic polymeric material, for example a phenolic polymer, an alkylphenol-acetylene resin, a maleic acid/rosin resin or a partially or completely hydrolysed polymer of maleic anhydride with styrene, ethylene or vinyl methyl ether, or carboxypolymethylene. It is also possible to use mixtures of the polymeric compounds mentioned. Preferred developers are acid-activated bentonite, zinc salicylates or the condensation products of p-substituted phenols with formaldehyde. The latter can also contain zinc.

The developers can additionally be used in a mixture with basically completely or substantially unreactive pigments or further auxiliary substances such as silica gel or UV absorbers, for example 2-(2-hydroxyphenyl)-benzotriazoles. Examples of such pigments are:

talc, titanium dioxide, zinc oxide, chalk; clays such as kaolin, and also organic pigments, for example urea-formaldehyde condensates (BET surface area 2–75 $m^2/g$) or melamine-formaldehyde condensation products.

The colour former mixture produces a coloured marking in those areas where it comes into contact with the electron acceptor. To prevent premature activation of the colour formers present in the pressure-sensitive recording material, the colour formers are generally separated from the electron acceptor. This can advantageously be done by incorporating the colour formers in foamlike, spongelike or honeycomblike structures. Preferably, the colour formers are enclosed in microcapsules which in general are disintegrable by pressure.

On disintegration of the capsules by pressure, for example by means of a pencil, the colour former solution is transferred to an adjacent sheet coated with an electron acceptor, thereby producing a coloured area. The colour results from the dye which is formed in the course of the process and which absorbs in the visible region of the electromagnetic spectrum.

Colour former mixtures are preferably encapsulated in the form of solutions in organic solvents. Examples of suitable solvents are preferably non-volatile solvents, for example polyhalogenated paraffin or diphenyl, such as chloroparaffin, monochlorodiphenyl or trichlorodiphenyl, and also tricresyl phosphate, di-n-butyl phthalate, dioctyl phthalate, trichlorobenzene, trichloroethyl phosphate, aromatic ethers, such as benzyl phenyl ether, hydrocarbon oils, such as paraffin or kerosine, derivatives of diphenyl, naphthalene or terphenyl which have been alkylated for example with isopropyl, isobutyl, sec.-butyl or tert.-butyl, dibenzyltoluene, terphenyl, partially hydrogenated terphenyl, mono- to tetramethylated diphenylalcanes, benzylated xylenes, or further chlorinated or hydrogenated, fused aromatic hydrocarbons. Frequently, mixtures are used of different solvents, in particular mixtures of dodecylbenzene, paraffin oils or kerosine and diisopropylnaphthalene or partially hydrogenated terphenyl to obtain optimum solubility for the colour formers, a rapid and deep coloration and a favourable viscosity for microencapsulation.

The capsule walls can be formed evenly around the droplets of the colour former solution by coacervation, and the encapsulation material can consist for example of gelatin and gum arabic, as described for example in U.S. Pat. No. 2,800,457. The capsules can preferably also be formed from an amino resin or modified amino resins by polycondensation, as described in British Patents 989,264, 1,156,725, 1,301,052 and 1,355,124. Similarly suitable are microcapsules formed by interface polymerization, for example capsules made of polyester, polycarbonate, polysulfonamide, polysulfonate, but in particular polyamide or polyurethane.

The microcapsules containing colour former mixtures can be used for producing pressure-sensitive copying materials of all the various known types. The various systems essentially differ from one another in the arrangement of the capsules and of the colour reactants and in the base material. Preference is given to an arrangement where the encapsulated colour former is present in the form of a layer on the back of a transfer sheet and the electron acceptor is present in the form of a layer on the front of a receiver sheet.

In another arrangement of the constituents, the microcapsules containing the colour former and the developer are present in or on the same sheet in the form of one or more individual layers or in the paper pulp.

The capsules are preferably attached to the base material by means of a suitable binder. Since paper is the preferred base material, this binder chiefly comprises paper-coating agents, such as gum arabic, polyvinyl alcohol, hydroxymethyl cellulose, casein, methyl cellulose, dextrose, starch or starch derivatives, or polymer latexes. The latter are for example carboxylated or uncarboxylated butadiene-styrene copolymers or acrylic homopolymers or copolymers.

The paper used comprises not only standard papers made of cellulose fibres but also papers in which the cellulose fibres have been (partly or wholly) replaced by fibres made of synthetic polymers.

The colour former mixtures of components (a) and (b) can also be used as colour formers in a thermoreactive recording material, for which use the mixture according to the invention is particularly qualified in that components (a) and (b) develop almost the same depth of shade at the same temperature, in particular at 110° to 200° C. The thermoreactive recording material generally contains at least one base material, the colour former mixture, an electron acceptor and can, if desired, also contain a binder and/or wax.

Thermoreactive recording systems comprise for example heat-sensitive recording and copying materials and papers. These systems are used for example for recording data signals, for example in electronic computers, teleprinters or telex machines or in recording equipment and measuring instruments, for example electrocardiographs. Image production (marking) can also be effected manually by means of a hot pen. A further way of producing markings by means of heat is a laser beam.

The thermoreactive recording material can be configured in such a way that the colour former is dissolved or dispersed in a binder layer and the developer is dissolved or dispersed in the binder in a second layer. In another option, both the colour former and the developer are dispersed in one and the same layer. The binder is softened in specific areas by means of heat, the colour former comes into contact with the electron accepter in these areas to which heat is applied, and the desired colour develops at once.

Suitable developers are the same electron accepters as used in pressure-sensitive papers. Examples of developers are the previously mentioned clay minerals and phenolic resins or even phenolic compounds as described for example in DE Patent 1,251,348, e.g. 4-tert.-butylphenol, 4-phenylphenol, methylene-bis(p-phenylphenol), 4-hydroxydiphenyl ether, α-naphthol, β-naphthol, 4-hydroxydiphenyl sulfone, 4-hydroxy-4'-methyldiphenyl sulfone, methyl or benzyl 4-hydroxybenzoate, 4-hydroxyacetophenone, 2,2'-dihydroxydiphenyl, 4,4'-isopropylidenediphenol, 4,4'-isopropylidene-bis-(2-methylphenol), an antipyrine complex of zinc thiocyanate, a pyridine complex of zinc thiocyanate, 4,4-bis-(4-hydroxyphenyl)valeric acid, hydroquinone,pyrogallol, phloroglucine, p-, m- or o-hydroxybenzoic acid, gallic acid, 1-hydroxy-2-naphthoic acid, and also boric acid and organic, preferably aliphatic, dicarboxylic acids, e.g. tartaric acid, oxalic acid, maleic acid, citric acid, citraconic acid or succinic acid.

Preferably, the thermoreactive recording material is prepared by means of meltable, film-forming binders. These binders are normally water-soluble, while the colour former mixtures and the developer are sparingly soluble or insoluble in water. The binder should be capable of dispersing and fixing the colour former mixture and the developer at room temperature.

Heat softens or melts the binder, so that the colour former mixture comes into contact with the developer and a colour can develop. Water-soluble or at least water-swellable binders are for example hydrophilic polymers, such as polyvinyl alcohol, polyacrylic acid, hydroxyethyl cellulose, methyl cellulose, carboxymethyl cellulose, polyacrylamide, polyvinylpyrrolidone, butadiene-styrene copolymers, carboxylated butadiene-styrene copolymers, gelatin, starch or etherified maize starch.

If the colour former mixture and the developer are present in two separate layers, it is possible to use water-insoluble binders, i.e. binders which are soluble in a completely or substantially polar solvent, for example natural rubber, synthetic rubber, chlorinated rubber, alkyd resins, polystyrene, styrene/butadiene copolymers, polymethacrylates, ethylcellulose, nitrocellulose, for example polyvinylcarbazole. However, the preferred arrangement is that where the colour former and the developer are present in a water-soluble binder in a single layer.

The thermoreactive layers can contain further additives. To improve the whiteness, to facilitate printing on the papers and to prevent sticking of the hot pen, these layers can contain for example talc, titanium dioxide, zinc oxide, alumina, aluminium hydroxide, calcium carbonate, clays or even organic pigments, for example urea-formaldehyde polymers. To bring about that the colour is formed only within a limited temperature range, it is possible to add substances, such as urea, thiourea, diphenylthiourea, acetamide, acetanilide, benzene-sulfanilide, stearamide, phthalic anhydride, metal stearates, for example zinc stearate, phthalonitrile, dimethyl terephthalate or other corresponding meltable products, which induce the simultaneous melting of colour former and developer. Preferably, the thermographic recording materials contain waxes, for example carnauba wax, montan wax, paraffin wax, polyethylene wax, condensates of higher fatty acid amides and formaldehyde and condensates of higher fatty acids and ethylenediamine.

In the methods of preparation and Examples which follow, percentages are by weight, unless otherwise stated.

Methods of preparation

A. 15.6 g of 2'-carboxy-2-hydroxy-4-pyrrolidinylbenzophenone are dissolved in 90 g of concentrated sulfuric acid at 30° C. 17.5 g of 2-di(phenylethyl)-amino-5-methoxytoluene are added at 0°-10° C. in the course of 45 minutes, and the temperature is maintained at 20°-25° C. for 20 hours. The sulfuric acid solution is then discharged onto ice-water to form a suspension at 15°-20° C. The phthalide product isolated by the filtering off is washed with water and stirred into 80 g of toluene, and 13.8 g of potassium carbonate are added. The suspension obtained is heated to 85° C. and is refluxed at 83°-85° C. for 3 hours. The cyclized fluoran product is dissolved in toluene, the phases are separated and the organic phase is evaporated to dryness. Recrystallization from isopropanol/toluene gives 5.2 g of a fluoran compound of the formula

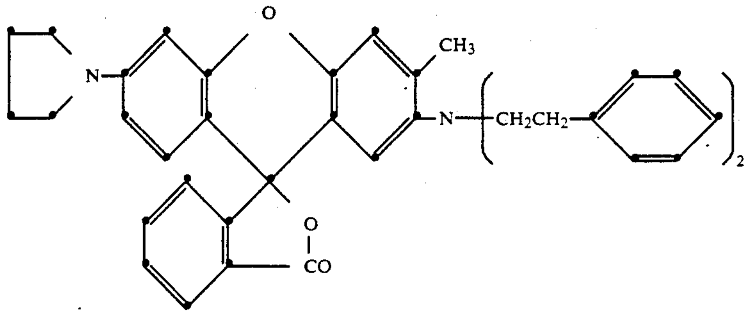

having a melting point of 150°-153° C. This colour former develops a red colour on active clay.

The same method applied to appropriate starting materials gives the following fluoran colour formers which develop a red or green colour.

B. 2-Dibenzylamino-3-methyl-6-pyrrolidinylfluoran Melting point 213°-215° C., red.

C. 2-Dibenzylamino-3-ethyl-6-diethylaminofluoran Melting point 173°-175° C., red. D. 2-Di-(phenethyl-)amino-6-diethylaminofluoran Melting point 143°-146° C., green.

E. 2-Di-(phenethyl)amino-3-methyl-6-diethylamino-fluoran, Melting point 130°-1326° C., red.

F. 2-Phenethylamino-6-diethylaminofluoran Melting point 170°-172° C., green.

G. 2-Phenisopropylamino-6-diethylaminofluoran Melting point 219°-229° C., green.

APPLICATION EXAMPLES

Example 1

A mixture of 0.675 g of 2-dibenzylamino-3-methyl-6-diethylaminofluoran (component (a)) and 1.5 g of 2-dibenzyl-amino-6-diethylaminofluoran (component (b)) is stirred at 20° C. into 97.8 g of a isomeric mixture of diisopropylnaphthalenes. The solution formed after 10 minutes is filtered. This solution is microencapsulated with gelatin and gum arabic by coacervation in a conventional manner, and the microcapsules are then mixed with starch solution and coated onto a sheet of paper. A second sheet of paper is coated on the front with a clay customary for use as colour developer. The first sheet and the paper coated with the colour developer are placed on top of each other with the coatings next to each other. Pressure is exerted on the first sheet by writing by hand or by means of a typewriter, and a very deep black copy develops at once on the developer-coated sheet and is found to be highly stable to storage.

Corresponding deep black colourings which are stable to storage are obtained when in the colour former mixture of Example 1 the components used there are replaced by the following components (a) and (b), which correspondingly replace either component (a) or (b) or both components.

Component (a)

1. 2-Dibenzylamino-3-ethyl-6-diethylaminofluoran
2. 2-Dibenzylamino-3-chloro-6-diethylaminofluoran
3. 2-Dibenzylamino-3-methyl-6-pyrrolidinofluoran
4. 2-Dibenzylamino-3-methyl-6-piperidinofluoran
5. 2-Dibenzylamino-3-methyl-6-dimethylaminofluoran
6. 2-Di(2,5-dimethylbenzyl)amino-3-methyl-6-diethylaminofluoran
7. 2-Di-(2,5-dichlorobenzyl)amino-3-methyl-6-diethylaminofluoran
8. 2-Di-(3-chlorobenzyl)amino-3-methyl-6-diethylaminofluoran
9. 2-Di-(4-chlorobenzyl)amino-3-methyl-6-diethylaminofluoran
10. 2-Di-(4-methylbenzyl)amino-3-methyl-6-diethylaminofluoran
11. 2-Di-(phenethyl)amino-3-methyl-6-pyrrolidinofluoran
12. 2-Di-(phenethyl)amino-3-methyl-6-diethylaminofluoran
13. 2-Dibenzylamino-3,4-dimethyl-6-diethylaminofluoran.

Component (b)

1. 2-n-Butylamino-6-diethylaminofluoran
2. 2-n-Octylamino-6-diethylaminofluoran
3. 2-n-Dodecylamino-6-diethylaminofluoran
4. 2-Benzylamino-6-diethylaminofluoran
5. 2,6-bis-(Diethylamino)fluoran
6. 2-Dibenzylamino-6-pyrrolidinofluoran
7. 2-Dibenzylamino-6-piperidinofluoran
8. 2-Dibenzylamino-6-N-p-tolyl-N-ethylaminofluoran
9. 2-Di-(4-chlorobenzyl)amino-6-diethylaminofluoran
10. 2-Dibenzylamino-4-methyl-6-diethylaminofluoran
11. 2-Di-(3'-methylbenzyl)amino-6-diethylaminofluoran
12. 2-Di-(2',4'-dimethylbenzyl)amino-6-diethylaminofluoran
13. 2-Di-(2',5'-dimethylbenzyl)amino-6-diethylaminofluoran
14. 2-Dibenzylamino-4-chloro-6-diethylaminofluoran
15. 2-Di-(4-methylbenzyl)amino-4-methyl-6-diethylaminofluoran
16. 2-Di-(4-chlorobenzyl)amino-4-methyl-6-diethylaminofluoran
17. 2-Di-(phenethyl)amino-6-diethylaminofluoran
18. 2-Di-(phenethyl)amino-6-pyrrolidonofluoran
19. 2-Phenisopropylamino-6-diethylaminofluoran
20. 2-Phenethylamino-6-diethylaminofluoran
21. 2-N-Methyl-N-phenylamino-6-N-ethyl-N-p-tolylaminofluoran
22. 2-N-Methyl-N-phenylamino-6-diethylaminofluoran
23. 2-Dibenzylamino-6-di-n-butylaminofluoran

EXAMPLE 2

First, two dispersions A and B are prepared.

To prepare dispersion A, 9 g of 4,4'-isopropylidenediphenol (bisphenol A), 31.5 g of a 10% aqueous solution of polyvinyl alcohol V03/140 and 18 g of water are ball-milled L to a particle size of 2–4 μm in the course of 2–4 hours.

To prepare dispersion B, 1 g of 2-dibenzylamino-3-methyl-6-pyrrolidinofluoran, 2 g of 2-dibenzylamino-6-pyrrolidinofluoran, 10.5 g of a 10% aqueous solution of polyvinyl alcohol V03/140 and 6 g of water are ball-milled to a particle size of 2–4 μm.

The two dispersions are then mixed.

The mixture is doctor-coated onto a sheet of paper having a weight per unit area of 50 $g/m^2$.

The amount of applied material is 3 $g/m^2$ (dry weight). A black colour develops rapidly at 110° C. and reaches its full depth of shade at about 170° C. The shade is stable over the entire temperature range and in storage.

Corresponding deep and stable black colourings are obtained when in the colour former mixture of Example 2 the components used there are replaced by components (a) and (b) as listed in Example 1, these fluoran compounds correspondingly replacing either component (a) or (b) or both components.

EXAMPLE 3 a) 1.3 g of 2-dibenzylamino-3-methyl-6-pyrrolidonofluoran (melting point 213°–215° C.) and 2.7 g of 2-dibenzylamino-6-pyrrolidinofluoran (melting point 179°–181° C.) are mixed, and the mixture is heated to 200° C. A clear melt forms. The melt is allowed to cool down, and the solidified mass is pulverized. This gives 4 g of a pale beige powder which has a softening point of 108° C. and is highly soluble in solvents used for encapsulation.

b) 4 g of the amorphous mixture as described in a) are suspended at 90° C. in 96 g of isomeric mixture of diisopropyl-naphthalenes and dissolved at 90° C. in the course of 1½ minutes.

This solution is microencapsulated with gelatin and gum arabic by coacervation in a conventional manner, and the microcapsules are then mixed with starch solution and coated onto a sheet of paper. A second sheet of paper is coated on the front with a phenolic resin customary for use as a colour developer. The first sheet and the sheet coated with the colour developer are placed on top of each other with the coatings next to each other. Pressure is exerted on the first sheet by writing by hand or by means of a typewriter, and a deep black copy having good light fastness develops immediately on the developer-coated sheet.

EXAMPLE 4

1.4 g of 2-dibenzylamino-3-methyl-6-diethylaminofluoran (melting point 159°–161° C.) and 2.6 g of 2-dibenzylamino-6-diethylaminofluoran (melting point 166°–170° C.) are mixed, and the mixture is heated to 180° C. A clear melt forms, which, after cooling down, is pulverized to give 4 g of a pale grey powder having a softening point of 100° C.

Two dispersions C and D are prepared.

To prepare dispersion C, 3 g of the above powder, 10.5 g of a 10% aqueous solution of polyvinyl alcohol V03/140 and 6 g of water are ball-milled to a particle size of 2–4 $\mu$m.

To prepare dispersion D, 9 g of 4,4'-isopropylidenediphenol (bisphenol A), 31.5 g of a 10% aqueous solution of polyvinyl alcohol V03/140 and 18 g of water are ball-milled to a particle size of 2–4 pm in the course of 2–4 hours.

The two dispersions C and D are then mixed.

The mixture is doctor-coated onto a sheet of paper having a weight per unit area of 50 g/m$^2$.

The amount of applied material is 3 g/m$^2$ (dry weight). A black colour rapidly develops at 100° C. and reaches its full depth of shade at about 170° C. The shade is stable over the entire temperature range and in storage.

What is claimed is:

1. A fluoran colour former mixture comprising at least (a) a fluoran component of the formula

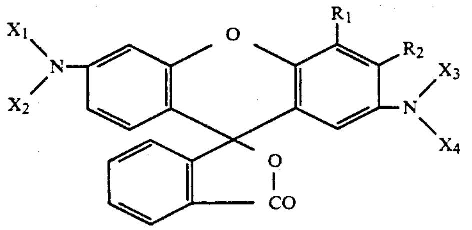

(1)

in which $R_1$ is hydrogen or methyl, $R_2$ is halogen, methyl or ethyl, $X_1$ is $C_1$–$C_4$-alkyl, cyclohexyl, phenyl or tolyl, $X_2$ is $C_1$–$C_4$-alkyl, or —$NX_1X_2$ is pyrrolidino, and $X_3$ and $X_4$ are each $C_7$–$C_9$-phenylalkyl or chlorine- or methyl-ringsubstituted benzyl, and (b) a fluoran component of the formula

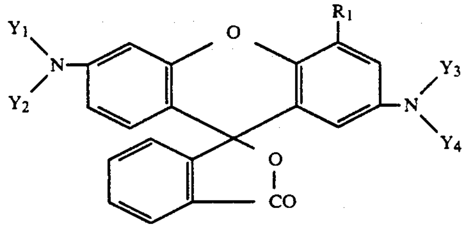

(2)

in which $R_4$ is hydrogen, halogen or methyl, $Y_1$ is $C_1$–$C_4$-alkyl, cyclohexykl, phenyl or tolyl, $Y_2$ is $C_1$–$C_4$-alkyl, or —$NY_1Y_2$ is pyrrolidino, and $Y_3$ and $Y_4$ are each $C_7$–$C_9$-phenylalkyl or chlorine- or methyl-ringsubstituted benzyl, wherein the weight ratio of (a):(b) is 1:3 to 1:2.

2. A colour former mixture according to claim 1, wherein component (a) is 2-dibenzylamino-3-methyl-6-diethylaminofluoran and component (b) is 2-dibenzylamino-6-diethylaminofluoran.

3. A colour former mixture according to claim 1 wherein the components (a) and (b) are present in the amorphous state.

4. A microencapsulated colour former mixture solution which contains at least one fluoran compound of the formula (1) and one fluoran compound of the formula (2) according to claim 1.

* * * * *